United States Patent [19]
McKinney et al.

[11] Patent Number: 5,126,729
[45] Date of Patent: Jun. 30, 1992

[54] AUTOMATED CHEMICAL STORAGE AND CHEMICAL FEED SYSTEM

[75] Inventors: John M. McKinney, Indian Head Park; Ali D. Ata, Downers Grove; Robert B. Wierzba, Bridgeview; William F. Flowers, Naperville, all of Ill.

[73] Assignee: Nalco Chemical Company, Naperville, Ill.

[21] Appl. No.: 385,989

[22] Filed: Jul. 21, 1989

Related U.S. Application Data

[63] Continuation of Ser. No. 223,862, Jul. 25, 1988, abandoned.

[51] Int. Cl.$^5$ .............................................. H04B 3/00
[52] U.S. Cl. .............................. 340/825.06; 364/481; 137/88
[58] Field of Search ............... 137/3, 4, 5, 6, 7, 88, 137/91, 92, 93; 340/825.06, 825.07, 870.16; 364/138, 188, 480, 481

[56] References Cited

U.S. PATENT DOCUMENTS

| | | | |
|---|---|---|---|
| 4,464,315 | 8/1984 | O'Leary | 137/5 |
| 4,583,170 | 4/1986 | Carlin et al. | 340/870.16 |
| 4,628,329 | 12/1986 | Regnault | 137/92 |
| 4,648,043 | 3/1987 | O'Leary | 137/93 |
| 4,719,574 | 1/1988 | Duback et al. | 137/3 |

Primary Examiner—Donald J. Yusko
Assistant Examiner—Dervis Magistre
Attorney, Agent, or Firm—Lloyd L. Zickert; Donald G. Epple; Anthony L. Cupoli

[57] ABSTRACT

An automated chemical storage and chemical feed system for a use station to chemically treat and monitor a process at a use station where the process is being run, including one or more base chemical supply tanks at the use station storing chemicals and intermittently or continuously feeding the chemicals to the process. A level sensor is provided in each base tank to determine the chemical level and to deliver a signal to a control and processing unit. Sensors may be provided on the process for providing chemical condition information to the control and processing unit. A telemetry system receives the information from the control and processing unit and transmits it to a supply station where the information is recorded and read out to monitor the chemical supply in the base tank and to monitor the chemical condition of the process so that the chemical feed may be adjusted as needed and so that further chemical may be delivered to the use station to be introduced into the base tank and maintain an adequate supply to prevent interruption of the process. Refill tanks are shipped from the supply station to the use station, transported to the base tank, and emptied into the base tank. Thereafter, the refill tanks are returned to the supply station to be refilled.

1 Claim, 3 Drawing Sheets

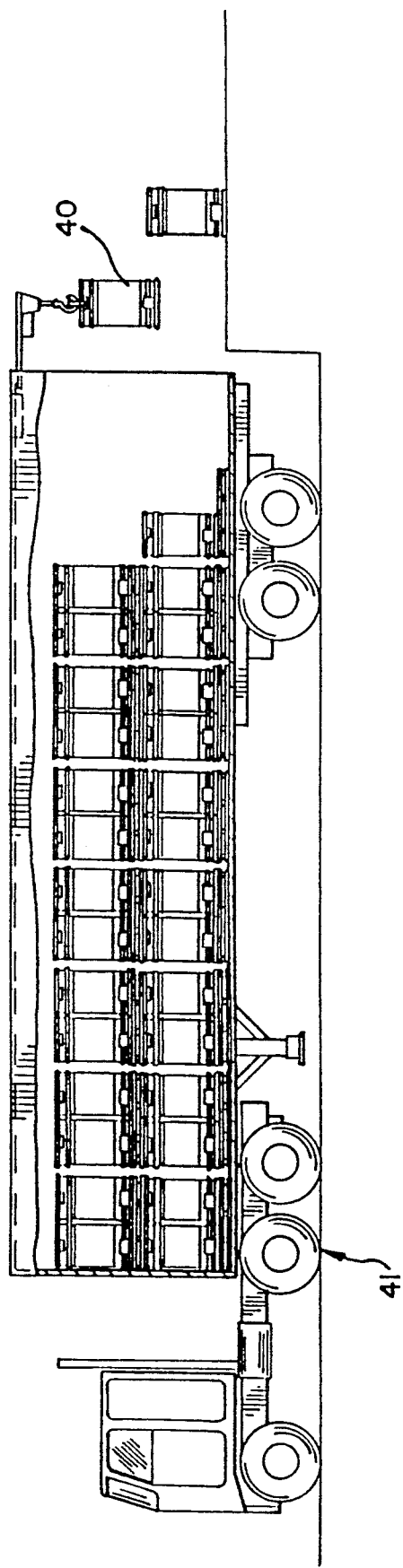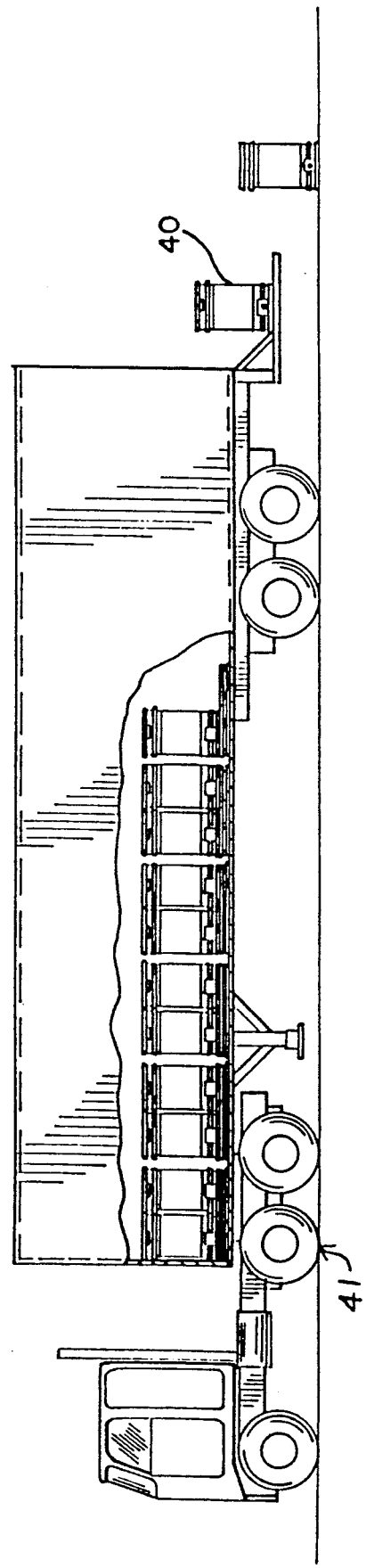

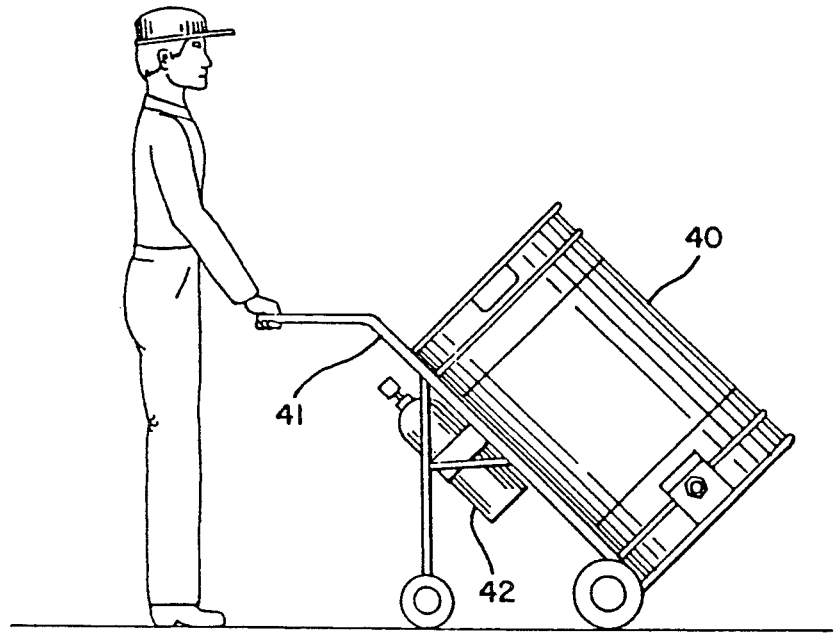
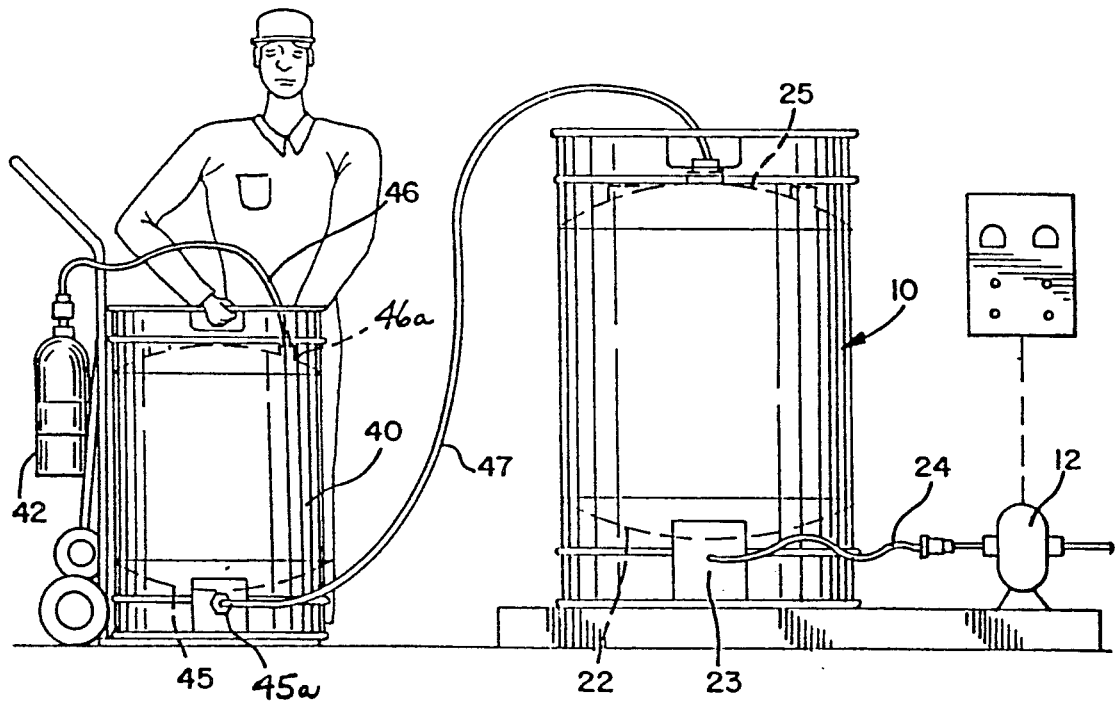

AUTOMATED CHEMICAL STORAGE AND CHEMICAL FEED SYSTEM

This application is a continuation of application Ser. No. 223,862, filed Jul. 25, 1988 now abandoned.

This invention relates in general to an automated chemical storage and chemical feed system for monitoring the chemical supply at the use station by a remote supply station to determine the need for supplementing the chemical supply at the use station, and more particularly to a monitoring system having a unit at the use station for monitoring the chemical supply and chemical condition of a process and transmitting by telemetry to a unit at the supply station of the chemical supply company for readout.

BACKGROUND OF THE INVENTION

Processes run by users/customers who require chemical additives/product must have a chemical supply stored at the process site where the process is being run and means for feeding the chemical into the process. For example, water-cooling towers that depend upon water for thermal conduction require chemical additives in the water in order to minimize corrosion of the equipment handling the water. Depending upon the chemical condition of the water, one or more chemicals may need to be added continuously or intermittently in order to produce the best possible results.

Heretofore, it has been customary to merely use a base supply tank at the use station for storing chemical and to intermittently or continuously feed the chemical into the water or liquid stream of the process, and provide one or more auxiliary refill tanks maintained on hand for refilling the base tank. The refill tanks, when empty, are then exchanged for other refill tanks shipped to the use station. Thus, an extra supply is always in inventory near the use station. Systems are used on site to determine the chemical condition of the water so that the proper feed of chemicals from one or more base tanks can provide the best treatment of the water for the process. When the base supply tanks are empty, they have been previously refilled if they are determined to be empty at the appropriate time either by the process workers or by personnel from the chemical supplier. Reliance on either has not been reliable, which then places the process in jeopardy and is costly to the user since the equipment condition deteriorates faster and the efficiency of the process is decreased. Further, there is always the chance of human error creeping into the ordering process for replenishment of the chemical supply. When improper control of the feed of chemicals to the process is encountered, such can cause use of excess chemicals, which is more costly to the user. Carrying an inventory of chemicals is also costly.

SUMMARY OF THE INVENTION

The present invention overcomes the difficulties heretofore encountered in maintaining efficient, accurate and reliable operation of a process, such as water treatment in a cooling system. It should be appreciated that chemical treatment of other processes can also be achieved by the present invention. Additionally, human error is substantially eliminated as to feed rate and ordering of replenishing chemicals, and inventory costs are minimized.

The present invention constitutes an automated chemical storage and chemical feed system where monitoring of the process needs at a use station, the site where a process is run, is accomplished at a remotely located supply station that may be many, many miles from the use station. When the supply station determines that adjustment in the chemical feed process is needed, that can be done by suitable controls at the supply station. Likewise, when it is determined at the supply station that the supply of chemical at the use station needs replenishing, an automatic order is placed to have delivered at the most opportune time additional chemical for reloading the chemical storage tank at the use station. A refill tank is shipped to the use station, and of a unique construction so it can be easily handled by a worker at ground level with a hand truck, and completely emptied into the base tank.

The present invention provides in one form apparatus at the use station including a base supply tank for storing chemical and having an outlet connected to the process needing the chemical. A suitable feed pump is provided for periodically or continuously feeding chemical from the storage tank to the process needing the chemical. A level sensor is provided in the base tank for sensing the level of chemical in the tank to measure the contents. The measurement information is delivered to a control unit that may have a microprocessor or other suitable control which then processes the information and delivers a signal to a telemetry system that in turn sends the information to a receiver at the supply station. Apparatus at the supply station decodes the information and records and/or provides it in readout form. The person monitoring this information at the supply station then can determine when there is a need to replenish the supply of chemical in the base tank and, at that time, automatically order a replenishing supply to be delivered to the use station in a portable tank that can be easily hand-trucked to the base tank. The chemical is forced out of the portable tank into the base tank by a suitable gas to complete the replenishing process and then the portable tank is returned to the supply station to be reloaded or refilled.

Additionally, the equipment at the use station may include sensors in the process to measure the chemical condition of the process and provide that information to a control and processing unit which is then in turn sent by telemetry to the supply station for the person to monitor and determine whether there is a need to adjust the feed of chemical to the process. Additionally, the sensing of the feed flow from the base tank to the process can be connected to the control and processing unit and delivered to the supply station for consideration. Controls may be provided at the supply station for adjusting the feed flow of a chemical in order to maintain the process at its optimum chemically treated condition. This eliminates the need for a worker at the use station to monitor the process, thereby minimizing the expense of treating the process.

Heretofore, sales personnel from the chemical supply company have periodically gone to the use station to monitor the supply of chemical. The present invention eliminates that necessity and frees up the sales personnel to handle other duties. More importantly, it removes the human error from the human monitoring of the supply of the chemical at the use station, thereby making the overall process needing the chemical more reliable to provide optimum performance of the process. By monitoring the process, the feed rate can be controlled to match the process requirements, thereby conserving use of chemicals.

The portable tanks used to refill the base tanks are unique in that they have a bottom discharge at the bottom wall which is dished toward the discharge, and are provided with a supply of gas to be introduced in the top of the tank to pressure unload the tank and provide clean and complete emptying of the chemical in the tank so it can be returned to the chemical supply company for refilling. By complete emptying, hazards from spilled chemical are also eliminated, making the refilling and tank handling operation safer. Additionally, complete emptying increases the useful product delivered to the user and decreases the waste cost to the user/customer and/or to the chemical supplier. Conventional containers leave one to about seven percent that constitutes waste.

It is therefore an object of the invention to provide a chemical storage and chemical feed system that monitors the chemical supply station from a remote supply station to enable automatic ordering of a replenishment of a supply of chemical, thereby eliminating human error in the ordering process, and also eliminating the possibility of running the process at the use station without chemicals.

Another object of the present invention is in providing an apparatus for remotely monitoring the quantity of chemical supply for a process at a use station so that sales personnel from the chemical supply company can be relieved of the manual monitoring of the supply at the use station and free up their time for more productive sales duties.

A still further object of the present invention is in the provision of a chemical storage and treatment monitoring system that monitors the chemical feed to a process from a remotely located chemical supply station where the feed rate of the chemical to the process can be adjusted to match the process requirements, thereby conserving the use of chemicals.

Another object of the present invention is to provide an automated chemical storage and feed system for a process run at a use station which materially minimizes inventory costs for the customer/user.

It is a further object of the present invention to provide a portable chemical container in the form of a tank having a bottom outlet and a sealable pressure fitting at the top connectable to a supply of pressurized gas for pressure emptying the contents of the tank into a storage tank so as to completely clean and empty the tank, whereby it can be returned to the bulk station for filling, whereby safer handling is achieved, and whereby more useful product is delivered to the user, while at the same time decreasing the waste cost to the user and/or the chemical supplier.

Other objects, features and advantages of the invention will be apparent from the following detailed disclosure, taken in conjunction with the accompanying sheets of drawings, wherein like reference numerals refer to like parts.

DESCRIPTION OF THE DRAWINGS

FIG. 3 is a diagrammatic view of a truck at the supply station being loaded with portable tanks of chemical for shipment to use stations;

FIG. 4 is a diagrammatic view of a truck with portable tanks and illustrating removal of the tanks from the truck to be delivered to the use station wherein the chemical in the tanks will be removed and transferred to a base tank;

FIG. 5 is a diagrammatic view of a person handling one of the portable chemical refill tanks used to refill a base tank and illustrating that the tank is sized so that it can easily be transported at the process site on a hand truck and maneuvered through relatively standard size doorways; and FIG. 6 is a diagrammatic view of the worker unloading the portable refill tank by discharging its contents into the tank at the area where the process is treated with the chemical from the base tank and illustrating the manner of completely emptying the portable refill tank.

DESCRIPTION OF THE INVENTION

The automatic chemical storage and chemical feed system of the present invention is illustrated as having a single base tank for feeding a single chemical to a process for chemical treatment of the process, and it will be appreciated that any number of base tanks may be used with different chemicals for treating a process. Indeed, there are some processes which require treatment by more than one chemical in order to make the process run efficiently.

Figure 1:
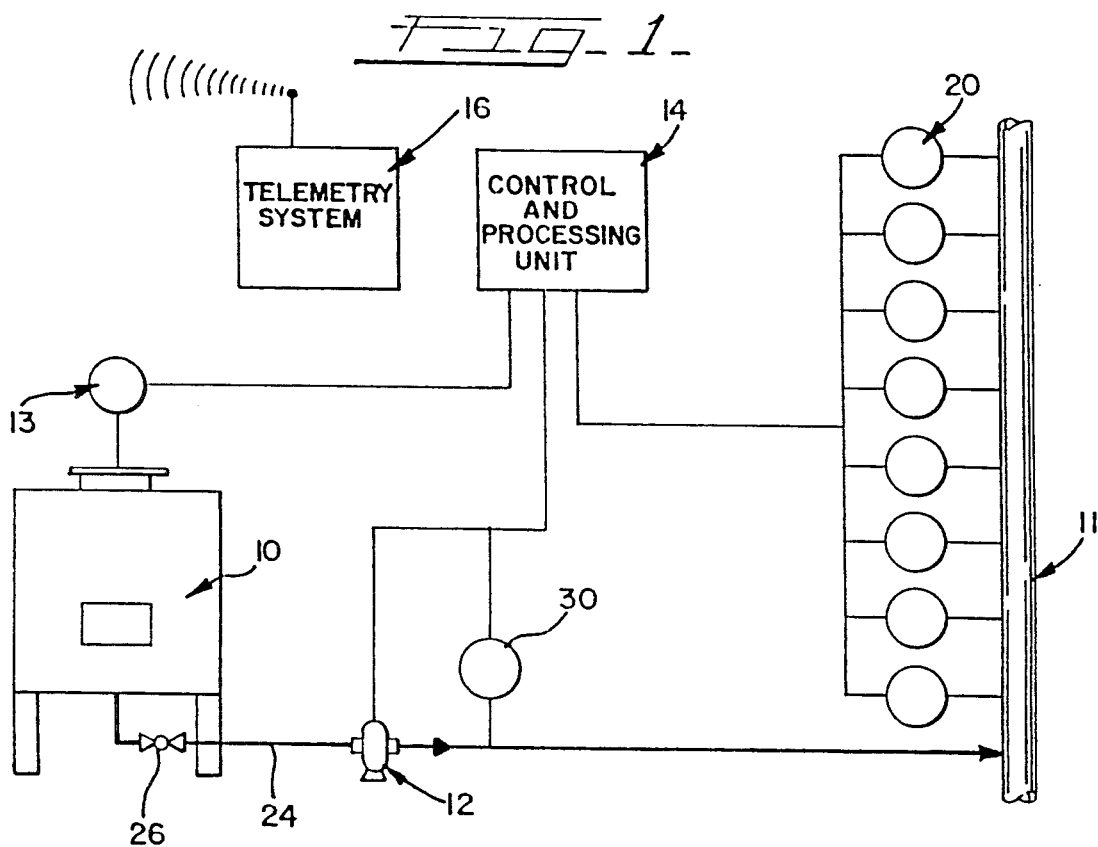
FIG. 1 is a schematic view of a use station apparatus for monitoring the level of chemicals in a storage tank and sensing chemical condition of the process and the flow of chemical being fed to the process, which information is inputted to a telemetry system for sending to a remote supply station for processing.

Referring now to the drawings, and particularly to FIG. 1, there is illustrated equipment provided at the use station where the process is being run for sensing and processing data to be transmitted by a telemetry system to a supply and monitoring station. This equipment generally includes a base tank 10 for storing chemical to be fed to the process 11 by a feed pump 12, a chemical level sensor 13 for sensing the level of the chemical in the tank 10, a control and processing unit 14 for processing information from the feed system, and a telemetry system 16 for transmitting the information from the processing unit to a supply station remotely located from the use station. Additionally, one or more sensors 20 may be provided for the process to sense the chemical condition of the process and then interconnected with the control and processing unit for delivering that information to the processing unit.

The base tank 10, as more particularly seen in FIG. 6, includes a downwardly dished bottom 22 which facilitates the gravitational movement of the liquid into a bottom outlet 23 that is connected to a feed line 24 and being in turn connected to the process 11, as shown in FIG. 1. A cover 25 is provided at the top end of the tank with any number of fittings for purposes of filling the tank from the top, venting the tank, and also the insertion of a device for sensing the level of chemical in the tank in the form of the level sensor 13 shown schematically in FIG. 1. The base tank 10 may be of cylindrical or cube shape as desired and will have a capacity normally in the neighborhood of 70 to 80 gallons. Tanks of higher or lower capacity may be provided as dictated by the needs of the user. As seen in FIG. 1, an on-off valve 26 may be provided in the feed line 24.

The level sensor may be of any suitable type which would provide an electrical signal in proportion to the level of chemical in the tank and which could then be translated to a quantity value. For example, an electrically responsive level sensing device may be used of the type disclosed in U.S. Pat. No. 4,169,377, owned by Nalco Chemical Company.

While eight sensors 20 are shown for sensing the chemical condition of the process 11 which would in most instances be a liquid system for handling thermal transfer, it will be appreciated that the use of such sensors is optional. Such sensors will provide a more accurate understanding of the chemical condition of the process in order to more reliably and accurately treat the process for optimum performance. The sensors would also be electrically responsive. For example, the flow of the liquid system in the process could be sensed in addition to PH, magnesium content, calcium content, and others, providing information to the person monitoring the process to assist in properly chemically treating the process.

A flow rate sensor 30 may also be provided in the feed line 24 in order to measure the flow rate in that line.

The control and processing unit 14 would include a suitable microprocessor for handling and processing the data received from the level sensor, the process and the feed flow in order to process the information for transmittal through the telemetry system 16 which is connected to it. Each of the sensors in the process is connected to the control and processing unit 14 as is the sensor for measuring flow of chemical in the chemical feed line 24. Additionally, the level sensor is connected to the control and processing unit. Finally, a control line for the feed pump 12 is connected to the control and processing unit so that the feed pump may be adjusted to provide the desired feed of chemical from the storage tank 10 to the process.

The telemetry system 16 may be of any suitable type in order to be able to transmit the information from the control and processing unit to a supply station that may be remotely located from the use station and in some cases many miles away. For example, the telemetry system may transmit the information by use of radio equipment or telephone lines. Also, the system would be optionally capable of receiving signals from the supply station to adjust the feed flow rate.

Figure 2:
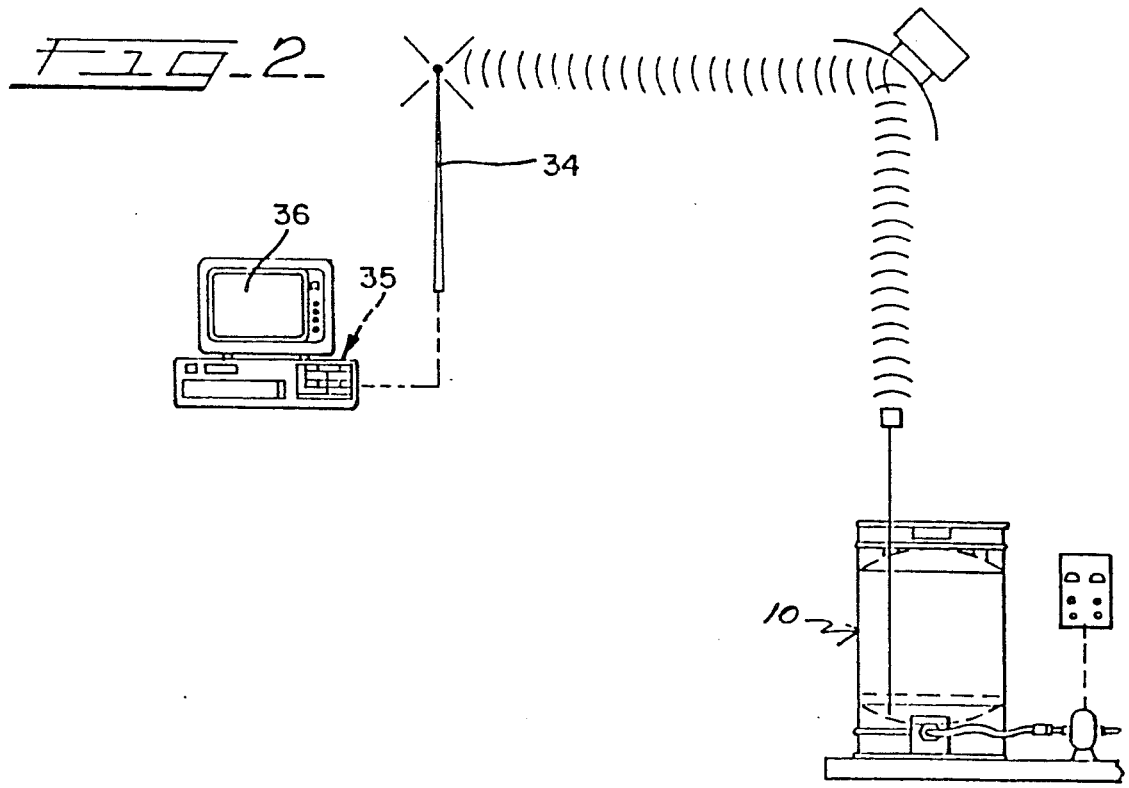
FIG. 2 is a schematic view of a base tank at the use station and the monitoring equipment at the supply station and illustrating that the information is transmitted from the use station to the supply station.

The signal or signals from the telemetry system at the use station are received by an antenna if radio telemetry is used, as seen by the antenna 34 in FIG. 2, which would be located at the supply station. This antenna is connected to a computer 35 having a suitable video display terminal 36. The computer 35 would process the data and provide a readout on the video display terminal for the person monitoring the system. It should be appreciated that the computer at the supply station would be set up to monitor any number of use stations. Further, it should be appreciated that a printer could be provided for printing the information processed by the computer.

Once the person at the supply or base station determines from the computer video display terminal that the quantity of chemical in the base tank at any particular use station is at a level where it will need replenishing so that the supply will not be exhausted leaving the process to run without the chemical, an order will be immediately set up by the person to deliver a tank of chemical to the use station for replenishing the supply of chemical in the base tank. This order will result in loading of one or more tanks 40 of chemical onto a truck 41 at the supply station. Thereafter, the truck would deliver the tanks to the supply station or stations needing the chemical, as seen in FIG. 4, where the tanks 40 would then be unloaded from the truck to be used at the supply station.

Thereafter, a worker would normally manually transport the refilled tank 40 to the site of the base tank 10. The refilled tanks 40 are of a smaller size than the base tanks, such as having a capacity of about 50 gallons, and they are sized so that they may be easily handled by a hand truck such as illustrated by the hand truck 41 in FIG. 5 and be moved through a standard three-foot-wide door opening. The truck would also include a cylinder of gas 42 to be used in the unloading of the portable refill tank.

Referring now to FIG. 6, it will be seen that the refill tank 40 includes a dish-shaped bottom 45 and an outlet 46 at the lowest point connectable to a discharge line 47 that may then be suitably connected to the top of the base tank 10 for the unloading process. It is also noted that at the location of the base tank the refill tank is brought to an upright position for unloading and the gas cylinder 42 has its outlet end connected by line 46 to a fitting 47 on the cover of the refill tank 40. The chemical in the refill tank is unloaded under gas pressure of about 15 psi in order to completely empty the refill container 40 so that it can be returned to the supply station to be refilled from a bulk container and used again for further refill purposes. By being completely empty, no possible accidental spill can then occur, making it safer to handle. Any suitable gas may be used for the cylinder 42, such as nitrogen.

It will now be appreciated that the structure of the refill tank 40, together with the system of emptying the tank, results in delivering more useful product to the user by complete emptying of the tank and eliminating waste cost of product to the user and the chemical supplier. Further, the chemical supplier is not burdened by the additional cost of cleaning the tank before refilling with product. The overall efficiencies therefore benefit both the user and the chemical supplier.

Once the refill tank 40 has been emptied, the fill line 47 is removed, and it will be considered that the base tank 40 has been replenished with chemical prior to being exhausted of its contents. This cycle of refilling will be repeated as often as needed and will not depend upon any workers at the use station for monitoring the contents of the base tank. Thus, inventory costs will be minimized and more reliable monitoring of the contents of the base tank will be achieved in order to eliminate the risk of leaving the process run without the use of a chemical.

It should also be appreciated that the feed pump may be run at a constant speed, and an adjustable flow control valve could be provided in the feed line, and be controlled by the controls at the supply station to regulate the chemical feed flow to the process.

Use of the control and processing unit for not only monitoring the system but also for controlling the operation of the feed pump and therefore the flow of chemical to the process will reduce chemical usage by reducing or stopping the feed of chemical to the process when the chemical condition of the process is at optimum condition. The control and processing unit will therefore control the feed rate of the chemical to the process to match the process requirements. It may be further appreciated that the safety of the overall system is enhanced and particularly the safety of the handling of the chemical by completely emptying the refill tank into the base tank.

By completely emptying the refill tank, residual chemicals are eliminated. This is beneficial in that more chemicals are provided for use in the process and less chemicals are to be treated and processed as waste. It should be noted that conventional containers leave one to seven percent in the container.

The present invention will eliminate the need for a salesperson to come to the use station for the purpose of monitoring the supply of chemical to the base tank, thereby freeing the salesperson to handle other more productive tasks. It will further be appreciated that this system will eliminate human error in the ordering of a further supply of chemical and eliminate the possibility of running the process without the chemical.

It will be understood that modifications and variations may be effected without departing from the scope of the novel concepts of the present invention, but it is understood that this application is to be limited only by the scope of the appended claims.

We claim:

1. Apparatus for remotely monitoring and maintaining a chemical supply for a process, said apparatus comprising, a base tank for the chemical at a use station at an on-site location, said base tank having an outlet adapted to be connected to the process to feed chemical to the process, means sensing the level of chemical in the tank and producing an electrical signal related to said level, telemetry means at the use station receiving the signal and transmitting it to a remotely located supply station at an off-site location, means at the supply station receiving the signal and converting it to a readout of the tank level and quantity, and means at the supply station for replenishing the supply, said means for replenishing the supply including a portable refill tank filled with the chemical to be transported to the use station for replenishing the chemical supply in the base tank, and said refill tank having a dished bottom and a bottom discharge, and a gas supply for pressure unloading to completely empty the contents, whereby the quantity data from the receiving means may be evaluated so that a replenishing chemical supply can be delivered when needed to avoid exhaustion of the chemical supply at the use station.

* * * * *